United States Patent [19]

Williamson

[11] 3,884,336

[45] May 20, 1975

[54] SAFETY MECHANISM FOR PRESSES, MACHINES AND FIXTURES

[76] Inventor: Robert W. Williamson, 77 Cedar Acres, Brunswick, Ga. 37520

[22] Filed: Jan. 23, 1974

[21] Appl. No.: 435,900

Related U.S. Application Data

[63] Continuation-in-part of Ser. No. 351,516, April 16, 1973, Pat. No. 3,847,259.

[52] U.S. Cl. .................. 192/131 R; 74/615; 100/53

[51] Int. Cl. .............................................. F16p 3/06

[58] Field of Search ..... 74/615; 100/53; 192/131 R, 192/131 H

[56] References Cited

UNITED STATES PATENTS

| | | | |
|---|---|---|---|
| 2,013,441 | 9/1935 | Goff et al. | 192/131 H |
| 3,011,610 | 12/1961 | Stiebel et al. | 192/131 R |
| 3,047,116 | 7/1962 | Stiebel et al. | 192/131 R |
| 3,804,002 | 4/1974 | Wingle | 192/131 R |

*Primary Examiner*—Allan D. Herrmann
*Attorney, Agent, or Firm*—Harness, Dickey & Pierce

[57] ABSTRACT

A safety mechanism including a hand restraint safety mechanism for use by an operator of a machine such as a press, special machine or fixture wherein (absent the present invention) the operator's hands are exposed to the hazard of being caught in the work area of the machine by moving machine elements when the machine is stroked. The hand restraints for the operator's hands are operatively coupled via cables with a fluidic power cylinder mounted in fixed dimensional relation to the machine with which the safety mechanism is used. This restraint cylinder is operative between restraining and released positions to control the length of each cable extended from a housing on which the cylinder is mounted. When the cables are maximally extended, the operator can reach into the machine to load or unload a workpiece. When the cables are minimally extended, the operator's hands are positively removed from the work area of the machine. A safety block mounted on the machine is operatively coupled with a second power cylinder for movement into and out of the work area of the machine. When the safety block is displaced into the machine work area, it mechanically prevents the machine elements from closing should the machine be accidentally stroked. A pneumatic control circuit is operatively coupled with the machine and includes multiple failsafe valves arranged to sense the operating positions of the cylinders and the machine for controlling the operation of the cylinders in a desired fashion. A cycle start signal to the machine is provided only when both the hand restraints and the safety block are retracted from the work area, and the safety block can be retracted only after the hand restraints have been retracted. The operator's hands are thereby maintained safe in a restrained position until the safety block is again extended into the work area after the machine has been stroked. After movement of all elements on the machine has terminated, the hand restraints are released to permit the operator manual access to the machine work area.

53 Claims, 21 Drawing Figures

SAFETY MECHANISM FOR PRESSES, MACHINES AND FIXTURES

CROSS REFERENCE TO RELATED APPLICATION

This application is a continuation in part of my co-pending application entitled Safety Mechanism For Special Machines and Fixtures, Ser. No. 351,516, filed Apr. 16, 1973, now issued as U.S. Pat. No. 3,847,259 on Nov. 12, 1974.

BACKGROUND AND SUMMARY OF THE INVENTION

The present invention relates to a safety mechanism including hand restraint safety mechanism for use by an operator of a machine having moving machine elements.

Heretofore, various types of hand restraining apparatus of the type to which the present invention relates have been used to remove the machine operator's hands from the path of travel of moving machine elements. In one type of prior hand restraint apparatus, the operator's hands are removed from the danger area as the machine operates. Thus, the operator's hands can still be in the danger area as the machine elements begin to move. A hand restraining safety apparatus which eliminates the above situation by preventing the machine from cycling until the operator's hands are in a safety position remote from the machine is disclosed in copending application of the same inventor for Safety Mechanism for Special Machines and Fixtures, Ser. No. 351,516, filed Apr. 16, 1973, now Pat. No. 3,847,259. In certain respects the present invention represents an improvement upon the safety apparatus of that eariler filed application.

Accordingly, one important objective of the present invention is to provide a safety mechanism for use by a machine operator wherein not only is movement of elements on the machine prevented until the operator's hands are disposed in a safety position remote from the machine, but also a mechanical safety interlock remains interposed between relatively movable machine elements until the operator's hands are in the safety position. Only after the safety mechanism displaces the operator's hands to the safety position is the mechanical interlock removed and then only with both the mechanical interlock removed and the operator's hands in the safety position is the machine stroked. At the conclusion of the machine stroke the mechanical interlock is reestablished before the hand restraint are released. Hence, a further object of the invention is to provide increased operator safety for the operators of various types of machines such as presses, special machines and fixtures.

The particular details of the present invention by which the foregoing objects are attained include a novel pneumatic control circuit having failsafe valve means operatively associated therewith to sense operating positions of various moving elements of the safety mechanism and the machine with which it is in use. Each failsafe valve means can pass a fluidic signal only when the element whose position is to be sensed is the intended position. By virtue of the unique arrangement of these failsafe valve means in pneumatic circuit, proper sequential operation of the various elements is always assured thereby providing maximum operator safety. In the preferred embodiment of the invention disclosed herein, the particular details of the novel pneumatic control circuit constitute further inventive features of the present disclosure.

One especially important improvement of the present invention involves a novel non-repeat circuit for the safety mechanism which prevents the safety mechanism from being repeatedly operated and the machine from being repeatedly stroked so long as the actuating element for initiating a machine cycle is held in the actuating position. Because of this beneficial feature, accidental cycling, and hence loss of production time, is eliminated.

The foregoing objects and features of the invention along with additional features, advantages and benefits of the invention will be seen in the ensuing description and claims which are to be taken in conjunction with the accompanying drawings. The drawings illustrate a preferred embodiment of the invention in accordance with the best mode presently contemplated for carrying out the invention.

DESCRIPTION OF THE PREFERRED EMBODIMENT

Figure 1:
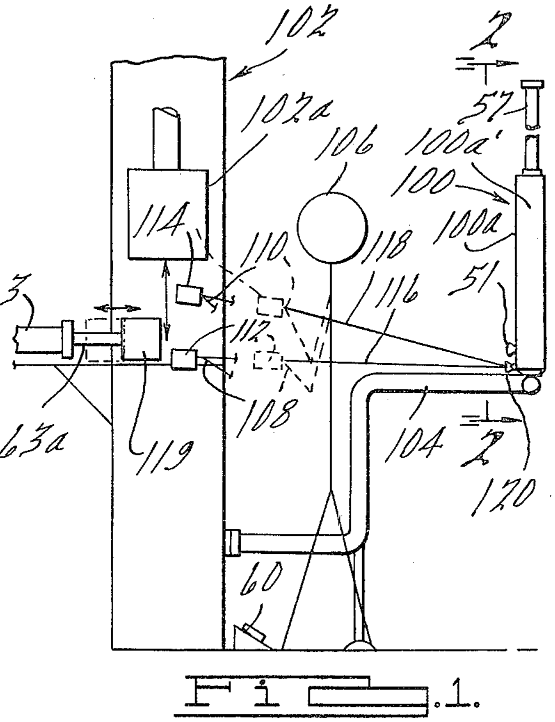
FIG. 1 is a side elevational view of a preferred form of safety mechanism according to the present invention mounted on and operatively coupled with a production machine and illustrating the usage of the present invention by the machine operator.
Figure 8:
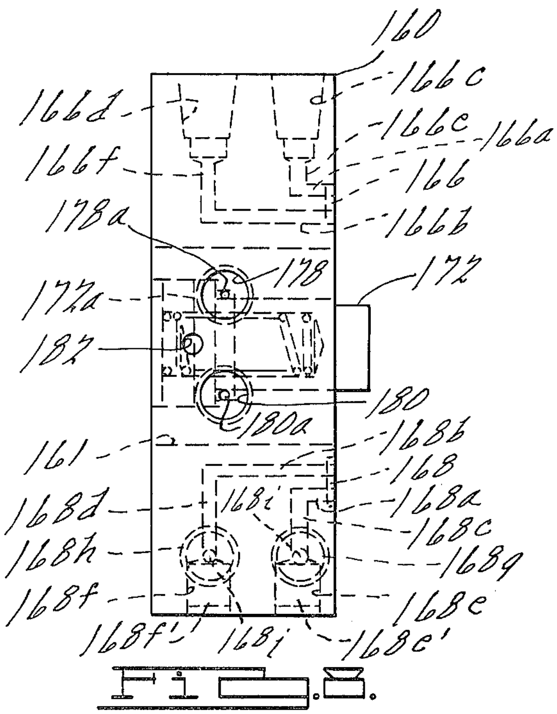
FIG. 8 is a left side elevational view of FIG. 7
Figure 9:
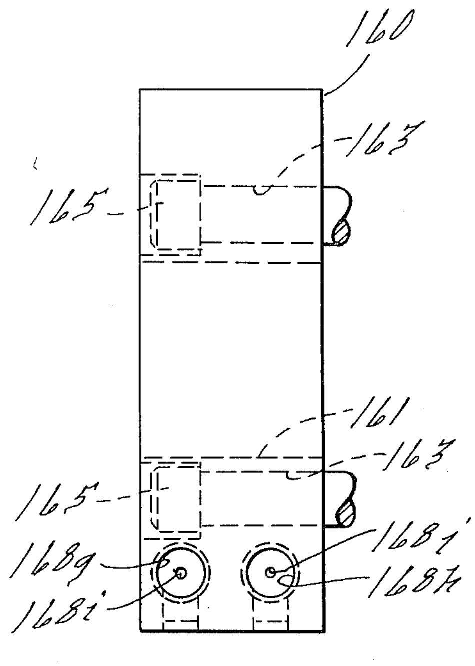
FIG. 9 is a right side elevational view of FIG. 7.
Figures 2, 6, 10:
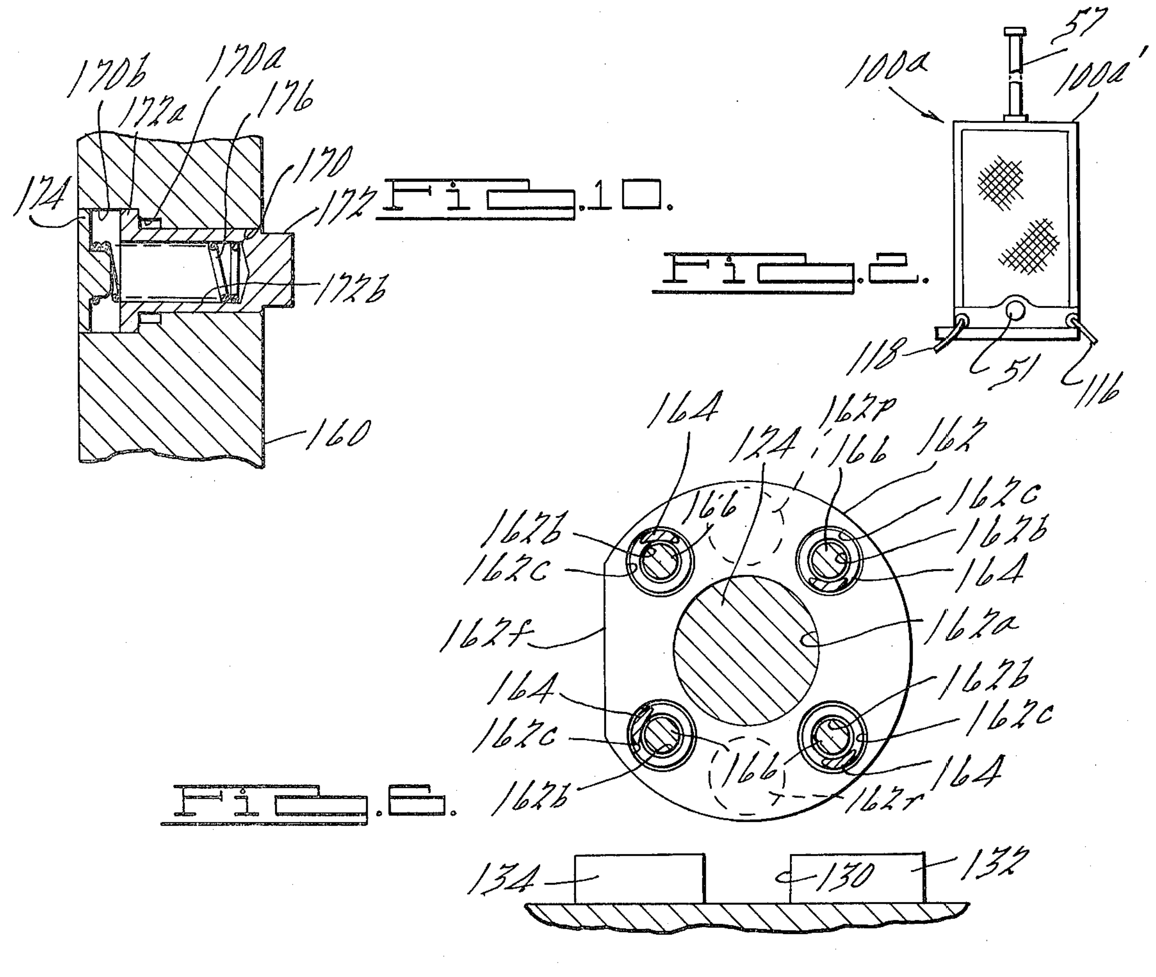
FIG. 2 is a view taken along line 2—2 in FIG. 1.
FIG. 6 is an enlarged sectional view taken along line 6—6 in FIG. 3.
FIG. 10 is an enlarged sectional view taken along line 10—10 in FIG. 7.

FIGS. 1 and 2 illustrate a safety mechanism 100 according to the present invention in use with a production machine 102 having a vertically reciprocally strokeable machine element 102*a*. Safety mechanism 100 comprises in part a hand restraint safety mechanism 100*a* contained in a housing 100*a'* mounted in fixed dimensional relation to machine 102 by means of a mounting structure 104. Sufficient space is provided between housing 100*a'* and machine 102 to accommodate a machine operator 106. The operator's hands 108 and 110 are respectively engaged with a pair of conventional hand restraints 112 and 114 respectively which are attached to the ends of flexible restraining cables 116 and 118 respectively extending from housing 100*a'*. The solid line positions of hands 108 and 110 and hand restraints 112 and 114 illustrate hand restraint safety mechanism 100*a* in the released position. In this position, sufficient lengths of cables 116 and 118 extend from housing 100*a'* to permit operator 106 to move his hands 108 and 110 into the machine work area for loading and/or unloading a workpiece. Absent the present invention, the operator's hands are exposed to the hazard of being caught by machine element 102*a* during its stroke. In view of the relatively fast operating speeds of certain types of machines, this can be an extremely hazardous situation. The broken line position of hand restraints 112 and 114 illustrates hand restraint safety mechanism 100*a* in the restraining position. In this position, sufficient lengths of cables 116 and 118 are drawn into housing 100*a'* to prevent operator 106 from moving his hands 108 and 110 into the machine work area.

Safety mechanism 100 further includes a mechanical interlock in the form of a safety block 119 mounted on machine 102 and arranged for movement into and out of the path of travel of machine element 102*a*. Safety block 119 is operatively coupled with the rod 63*a* of a power cylinder 63 to effect displacement thereof into and out of the machine work area. The size and strength of block 119 are such that when disposed in the path of travel of element 102*a* (i.e., in the extended or safety position as illustrated by the solid line position in FIG. 1), it will interrupt and limit the downward stroke of element 102*a* to prevent closure of element 102*a* on a workpiece should element 102*a* be stroked for any reason. Further, safety mechanism 100 is arranged such that when block 119 is in the safety position and hand restraint safety mechanism 100*a* is in the released position, the operator's hands 108 and 110 cannot be displaced far enough to be caught between block 119 and element 102*a*. Also, the vertical dimension of block 119 is such that adequate hand clearance is provided between element 102*a* and the workpiece when element 102*a* is closed on block 119. Thus, block 119 provides a mechanical safety interlock with machine 102 whereby full closure of machine element 102*a* can be prevented with block 119 in the safety position. As will be seen in greater detail hereinafter, machine 102 cannot cycle until both the operator's hands 108 and 110, as well as safety block 119, are removed from the path of travel of machine element 102*a* and one of the inventive features of the present disclosure involves the way in which the operation of various elements of safety mechanism 100 are interlocked with each other and with machine 102.

In order to facilitate the reader's understanding of the ensuing detailed description, it is desirable to summarily describe the operation of the safety mechanism 100 in relation to the operation of machine 102. With machine element 102*a* stopped at its uppermost limit of travel, safety mechanism 100 first operates safety block 119 to the safety position and then hand restraint safety mechanism 100*a* to the released position. Since cables 116 and 118 are now maximally extended from housing 100*a*, operator 106 can reach his hands into the work area to load a workpiece into the machine. It will be observed that should element 102*a* be accidentally stroked with the hand restraint safety mechanism 100*a* in the released position, that safety block 119 will prevent element 102*a* from closing on the operator's hands should they be in the work area of the machine. After the workpiece has been loaded, operator 106 actuates a starting device which may be in the form of a foot pedal valve 60 (FIG. 1). Safety mechanism 100, in response to the actuation of valve 60, first operates hand restraint safety mechanism 100*a* to the restraining position thereby drawing cables 116 and 118 into housing 100*a'* and positively removing the operator's hands from the machine work area. Only when mechanism 100*a* is in the restraining position is block 119 removed to its retracted position out of the path of travel of machine element 102*a*. Now only with both hand restraint safety mechanism 100*a* in the restraining position and safety block 119 in the retracted position can the machine operating cycle be initiated. During the stroke of machine element 102*a*, safety mechanism 100 prevents cables 116 and 118 from being extended from housing 100*a'* and prevents safety block 119 from being shifted to the safety position. Thus, while machine element 102*a* is moving, the operator's hands and safety block 119 are positively held out of its path of travel. Only after the machine has completed a cycle (that is, only after machine element 102*a* has been stroked) does safety mechanism 100 operate safety block 119 to the safety position. Only after safety block 119 is at its safety position does hand restraint safety mechanism 100*a* operate to the released position thereby extending cables 116 and 118 to provide the operator with manual access to the machine work area for unloading the completed workpiece and loading a new workpiece. It will thus be observed that the operator can have manual access to the machine work area only when safety block 119 is at its safety position. Moreover, since the hand restraints are not released until safety block 119 is at its safety position, it will also be noted that manual access to the machine work area cannot occur until movement of all elements on the machine, including safety block 119, has ceased.

Figure 4:
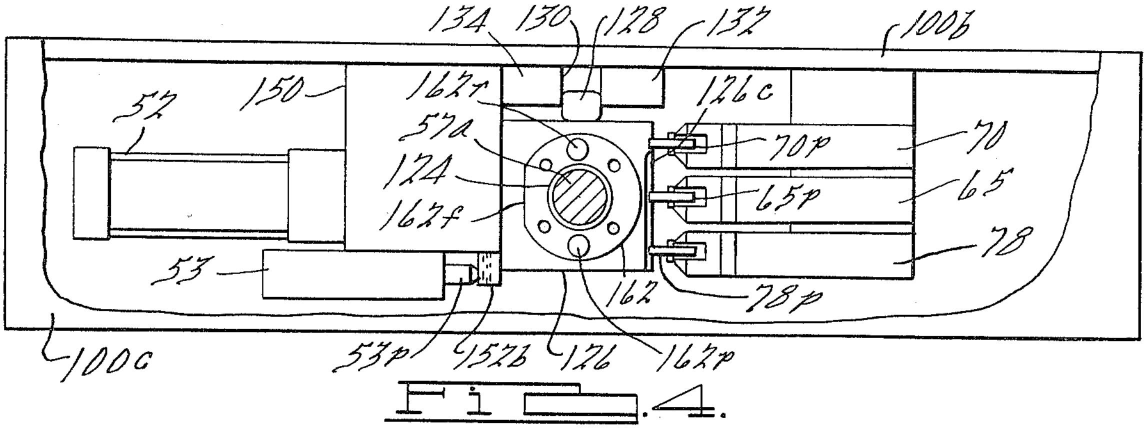
FIG. 4 is an enlarged view taken along line 4—4 in FIG. 3.
Figure 5:
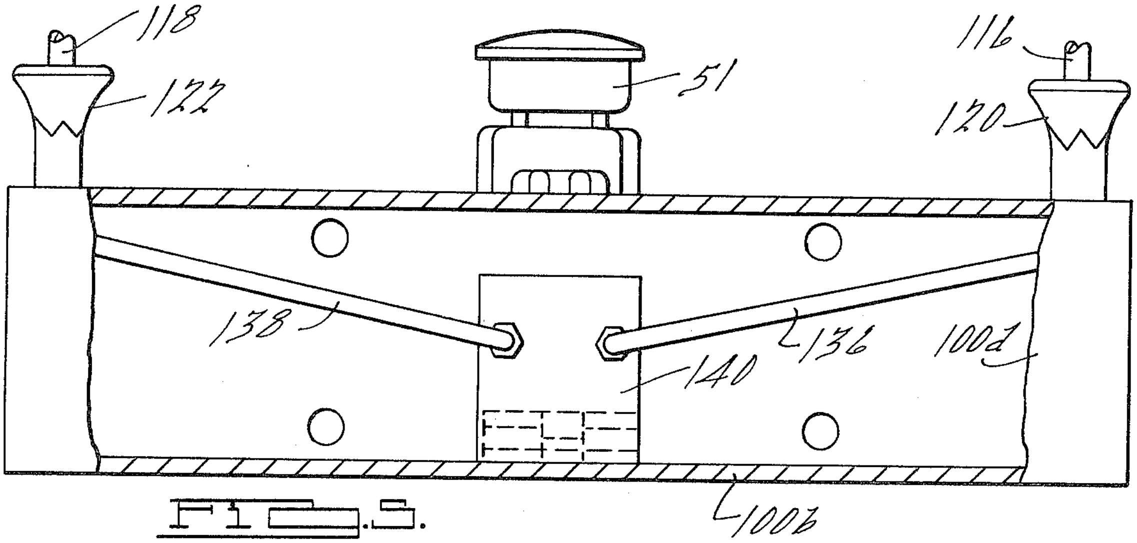
FIG. 5 is an enlarged view taken along line 5—5 in FIG. 3.
Figure 7:
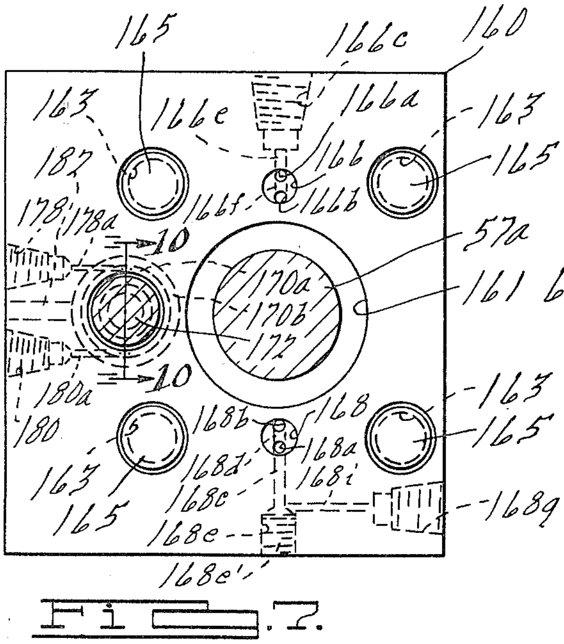
FIG. 7 is an enlarged sectional view taken along line 7—7 in FIG. 3.
Figure 3:
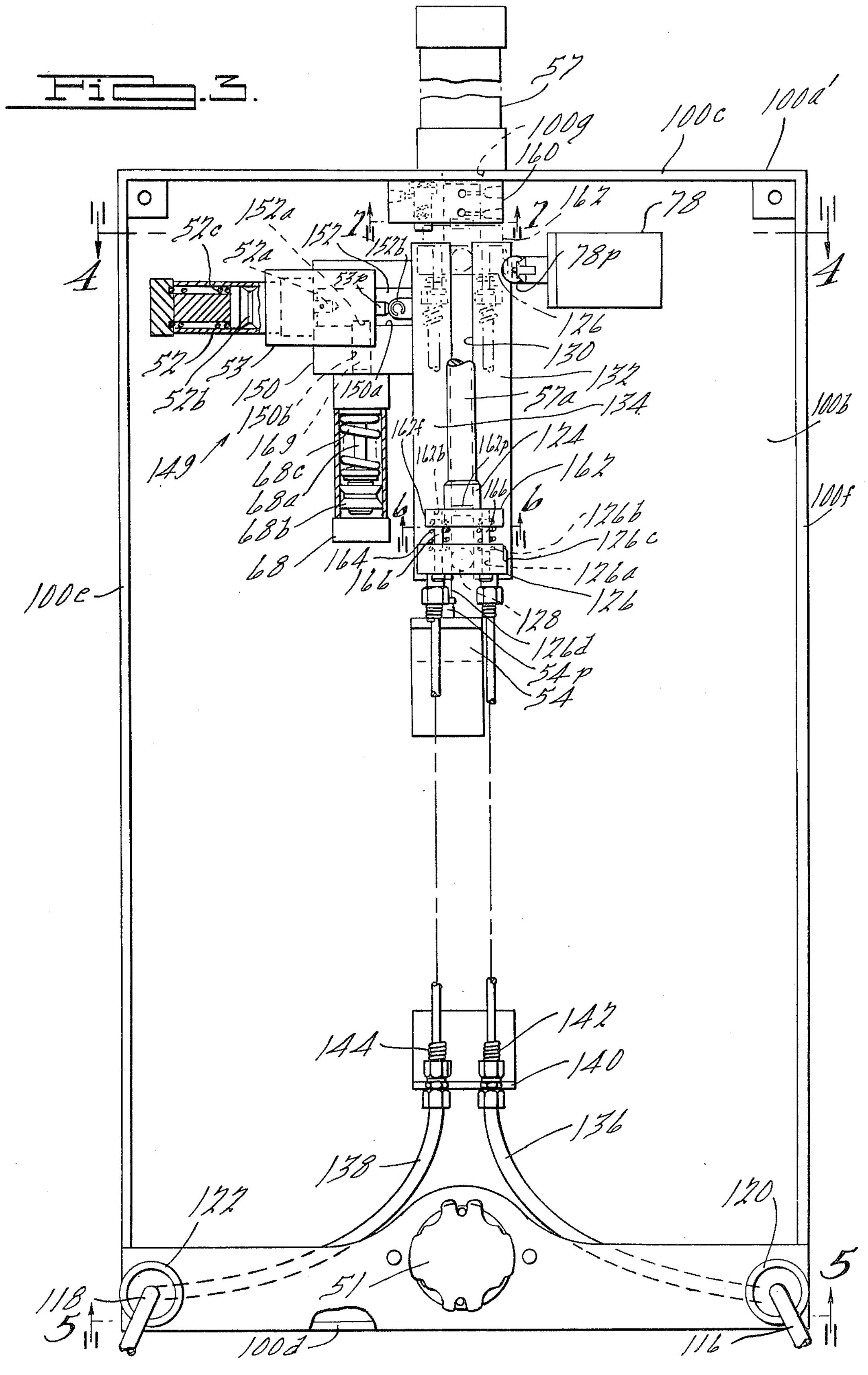
FIG. 3 is an enlarged view of FIG. 2 and having a portion removed.

Details of safety mechanism 100 are shown in FIGS. 3–12. Attention is first directed to FIGS. 3–5 showing the sturdily constructed rectangular housing 100*a'* having a vertical back wall 100*b*, top and bottom walls 100*c*, 100*d* and side walls 100*e*, 100*f*. The open interior of housing 100*a'* is enclosed by a removable cover which has been removed from FIG. 3 to expose the interior construction. Cable guides 120, 122 for guiding cables 116, 118 into and out of housing 100*a'* are mounted at the lower corners of housing 100*a'*. A pneumatic cylinder 57, hereinafter referred to as restraint cylinder 57, is centrally mounted on top wall 100*c* above housing 100*a*'. A suitable circular opening 100*g* is provided in top wall 100*c* through which the rod 57*a* of restraint cylinder 57 extends into the interior of housing 100*a*'. Rod 57*a* also passes through a valve body 160 on the inside of wall 100*c*, and details of body 160 will be explained later. As best seen in the solid line position of FIG. 3 (which, as will become apparent, represents the released position of the hand restraints), a bushing 124 is affixed to the free end of rod 57*a*, and a cable attaching member 126 in the form of a generally square plate is affixed to bushing 124. A roller 128 is mounted on member 126 and rides in a guideway 130, formed between a pair of guide members 132 and 134 on back wall 100*b*. A valve member 162 in the form of a generally round plate is mounted on bushing 124 and yieldably coupled with member 126. As will be explained later, valve member 162 is cooperatively associated with valve body 160, this arrangement constituting one of the several embodiments of failsafe valves disclosed herein. As best seen in FIG. 6, valve member 162 is journaled on bushing 124 by a large circular bore 162*a* to permit member 162 to slide lengthwise thereon. Four smaller threaded bores 162*b* are arranged 90° apart around bore 162*a*, and each is counterbored at 162*c* to receive one end of a coil spring 164. The other end of each coil spring 164 lodges in a corresponding counterbore 126*b* (FIG. 3) of a corresponding bore 126*a* in member 126. The threaded shanks of headed guide pins 166 are passed through bores 126*a* to engage bores 162*b* and thereby compress springs 164 such that member 162 is yieldably mounted for lengthwise displacement on bushing 124 relative to member 126. A pair of circular pads 162*p*, 162*r* (FIG. 6) are affixed to the upper surface of member 162 on opposite sides of bore 162*a*; as will be seen later, pads 162*p*, 162*r* close respective bores in valve body 160 when the safety mechanism is in the restraining position. Note also that the side of member 162 facing wall 100*e* has a flat 162*f*.

A pair of cable guiding sleeves 136, 138 extend from cable guides 120, 122, respectively, to a mounting bracket 140 which is affixed to wall 100*b* in alignment with, but somewhat spaced from cable attaching member 126. Cables 116, 118, upon entering housing 100*a*' via guides 120, 122, are guided through sleeves 136, 138, respectively, and the ends of the cables are affixed to member 126. Helical springs 142, 144 are disposed around each cable 116, 118, respectively, between member 126 and bracket 140 to assist in guiding the cables. When cylinder rod 57*a* is extended (solid line position of member 126, etc.), cables 116, 118 are extended from housing 100*a*' to permit hand restraints 112, 114 to be displaced to the released position. When cylinder rod 57*a* is retracted (broken line position of member 126), cables 116, 118 are pulled into housing 100*a*', thereby retracting hand restraints 112, 114, and hence the operator's hands, to the restraining position. During operation of cylinder 57, roller 128 guides member 126 along guideway 130. It will be observed that with the safety mechanism 100*a* in the restraining position, valve member 162 has been displaced on bushing 124 toward member 126 because of abutment with valve body 160 via the plastic pads 162*p*, 162*r*. Valve member 162 and valve body 160 are arranged in relation to the stroke of cylinder rod 57*a* such that pads 162*p*, 162*r* abut the lower surface of body 160 prior to cylinder rod 57*a* arriving at the retracted position. Thus, after pads 162*p*, 162*r* abut body 160 to arrest further travel of member 162 relative thereto, cylinder rod 57*a* continues along a final increment of travel toward the retracted position while member 162 is increasingly displaced on bushing 124 toward member 126 against the spring force of springs 164 with member 126 continuing to move with cylinder rod 57*a* over the final increment of travel toward the retracted position. When cylinder rod 57*a* is extended from the retracted position, member 162 initially remains in abutment with valve body 160 until member 126 has been extended to abut the heads of guide pins 166 after which member 162 also beings to move with cylinder rod 57*a* away from valve body 160.

A plurality of four valves, 54, 65, 70 and 78 are mounted on wall 100*b* for actuation in accordance with the position to which member 126 is operated by cylinder 57. Valve 54 has a plunger 54*p* positioned for actuation by the head of a stud 126*d* threaded into a tapped hole in the bottom surface of member 126; valve 54 being disposed for operation to its actuated, or tripped, position when cylinder rod 57*a* is fully extended (i.e., hand restraints in the released position) and stud 126*d* provides a convenient adjustment for attaining this result. Valves 65, 70 and 78 are stocked (FIG. 4) and have their roller-type plungers 65*p*, 70*p* and 78*p* positioned for actuation by member 126. A cam surface 126*c* is fashioned along a portion of the upper side edge of member 126 so that plunger 70*p* is actuated slightly before plungers 65*p* and 78*p* as member 126 approaches the restraining position. Thus valves 65, 70 and 78 are actuated when cylinder rod 57*a* is fully retracted (i.e., hand restraints in the restraining position), but with valve 70 being actuated slightly before valves 65 and 78 as the cylinder rod retracts. A valve 83 (shown only in FIG. 11) is positioned adjacent valve 54 for actuation by member 126 when the latter is in the released (i.e., illustrated) position. A palm-button operated reset valve 51 is mounted on housing 100*a*' between cable guides 120, 122. Details of the pneumatic circuit arrangement of the above valves will be covered in the description of FIG. 11.

A low air pressure safety interlock 149 (see FIG. 3) mechanically restricts the travel of cylinder rod 57*a* when the system supply line air pressure drops below a predetermined level. By way of example, this may occur when a nominal pressure of 80 psi drops below 60–65 psi. A rectangular block 150 is affixed to wall 100*b* alongside the top end of guide 134. A guideway 150*a* is fashioned in block 150 at a right angle to the travel of cylinder rod 57*a*. A second guideway 150*b* is fashioned in block 150 to intercept guideway 150*a* at a right angle. A slide 152 is guided in guideway 150*a* and is shiftable lengthwise of the guideway into and out of the path of travel of member 126 by means of a pneumatic cylinder 52. Cylinder 52 has a cylinder rod 52*a* connected to a piston 52*b* and the later is engaged by a coil spring 52*c* such that rod 52*a*, and hence slide 152, are urged to the extended position. (The drawing, however, illustrates cylinder 52 and slide 152 in the retracted position.) In the retracted position, slide 152 clears the path of travel of member 126, thereby permitting the latter to freely move between the released and restraining positions when cylinder 57 is operated. However, when cylinder rod 52*a* is fully extended, slide 152 is disposed within the path of travel of member 126, thereby restricting the travel of the latter. Thus, if member 126 is in the restraining (broken line) position (of FIG. 3) when cylinder 52 moves slide 152 into the path of travel of member 126, then it is impossible for cylinder rod 57*a* to be fully extending and thus hand restraints 112, 114 cannot be moved to the released position. If member 126 is in the released position when slide 152 is shifted into the path of travel of member 126, then member 126 cannot be brought to the restraining position, and as will be seen later, machine element 102*a* cannot be stroked. Note that will slide 152*a* extended, member 162 does not hit the slide because of the clearance provided by flat 162*f*. Another cylinder 68 is mounted on block 150 in alignment with guideway 150*b*. A slide 169 is affixed to the cylinder rod 68*a* of cylinder 68, and is guided in guideway 150*b*. A coil spring 68*c* biases the piston 68*b* of cylinder 68 to urge cylinder rod 68*a*, and hence slide 169, toward the retracted position. (The drawing, however, illustrates cylinder 68 and slide 169 in the latched position.) With cylinder rod 68*a* in the retracted position, the end of slide 169 clears guideway 150*a*. However, when sufficient air pressure is introduced into the head end of cylinder 68, the bias of spring 68*c* is sufficiently overcome to move slide 169 into guideway 150*a*. With cylinder rod 52*a* retracted, slide 169 latches in a groove 152*a* fashioned in the side of slide 152. As long as sufficient air pressure continues to be supplied to cylinder 68, the latching engagement of slide 169 with groove 152*a* is maintained to hold slide 152 clear of the path of travel of member 128. However, when the supply line pressure drops below a predetermined level, the force of spring 68*c* is sufficient to remove slide 169 from groove 152*a* and when this happens, spring 52*c* urges slide 152 into the path of travel of member 126. This condition remains until the system is reset and sufficient air supply pressure again exists. This aspect along with the way in which cylinders 52 and 68 are connected in the pneumatic control circuit will be explained in greater detail in connection with the description of FIG. 11. A pilot supply valve 53 is mounted on block 150 and has its plunger 53*p* actuated by a pin 152*b* on slide 152 when the latter is out of the path of travel of member 126. The connection of valve 53 in circuit will also be covered in the description of FIG. 11.

In accordance with important features of the present arrangement, a failsafe circuit is provided whereby it is impossible for machine 102 to be stroked when the hand restraints are in other than the restraining position, and the safety block in other than the retracted position. This failsafe circuit is embodied in part by the construction details of valve body 160. Therefore, attention is directed to FIGS. 7–10 which illustrate these details. Body 160 is of generally square shape and mounted on the inside of top wall 100*c* in general alignment with cylinder 57. Valve body 160 comprises a large cylinder hole 161 aligned with hole 100*g* in the housing top wall (FIG. 3). Rod 57*a* passes through hole 161, and hole 161 is large enough to accommodate bushing 124 when cylinder rod 57*a* is retracted. Suitable holes 163 are arranged around hole 161 and suitable fasteners 165 are passed through these holes and matching holes in wall 100*c* and in the mounting flange of cylinder 57 whereby both cylinder 57 and body 160 are mounted to wall 100*c*. A pair of shallow bores 166, 168 are fashioned in the surface of member 160 which faces member 162, and are on diametrically opposite sides of hole 161. A pair of small, thin passages 166*a*, 166*b* extend upwardly through member 160 from the interior end of bore 166. A pair of holes 166*c* and 166*d* for reception of pneumatic line fittings are fashioned in one side of body 160 at right angles to passages 166*a*, 166*b*. A small, thin passage 166*e* extends into body 160 from the interior end of hole 166*c* to intercept the interior end of passage 166*a*. A small, thin passage 166*f* extends from the interior end of hole 166*d* to intercept the interior end of passage 166*b*. In similar fashion, a pair of small, thin passages 168*a* and 168*b* extend into block 160 from the interior end of bore 168. These two passages are intercepted by passages 168*c* and 168*d*, which latter passages extend from the interior ends of holes 168*e* and 168*f* formed in the side of member 160 opposite holes 166*c* and 166*d*. In order to effect connection of pneumatic line fittings at the side of member 160 which faces wall 100*f*, a pair of holes 168*g* and 168*h* are fashioned therein and small, thin passages 168*i* and 168*j* extend from the interior ends of these latter two holes to intercept passages 168*c* and 168*d*. Holes 168*e* and 168*f* are plugged by plugs 168*e'* and 168*f'*. As mentioned earlier, valve member 162 is cooperatively associated with valve body 160. When valve member 162 abuts valve body 160, pads 162*p*, 162*r* close on bores 166 and 168 respectively. With bore 166 closed by pad 162*p*, a pneumatic fluid path, through which a fluidic signal can pass, is created between hole 166*c* and hole 166*d* via passages 166*e*, 166*a*, bore 166, and passages 166*b* *and 166f;* and with bore 168 closed by pad 162*r*, a pneumatic fluid path, through which a fluidic signal can pass, is created between hole 168*g* and hole 168*h* via passages 168*i*, 168*c*, 168 *a*, bore 168, and passages 168*b*, 168*d* and 168*j*. Thus these constructions provide a pair of failsafe valves available for connection in pneumatic circuit. As will be seen in FIG. 11, only one of these valves is utilized and is identified by the numeral 66 in that figure. The fluid path through each valve such as 66 is created immediately upon abutment of valve member 162 with body 160; since member 162 is yieldable mounted on member 126, valve 66 can conduct a fluidic signal as member 126 moves over its final increment of travel to the restraining position.

As will be seen later, other failsafe valves (such as valve 83 mentioned earlier) are used in the present invention. All such failsafe valves are functionally identical to failsafe valve 66; that is, only when an actuating member closes the open bore of the failsafe valve (such as member 162 closing on bore 166 in valve 66) is a fluid path created through which a fluidic signal can be transmitted.

Figure 11:
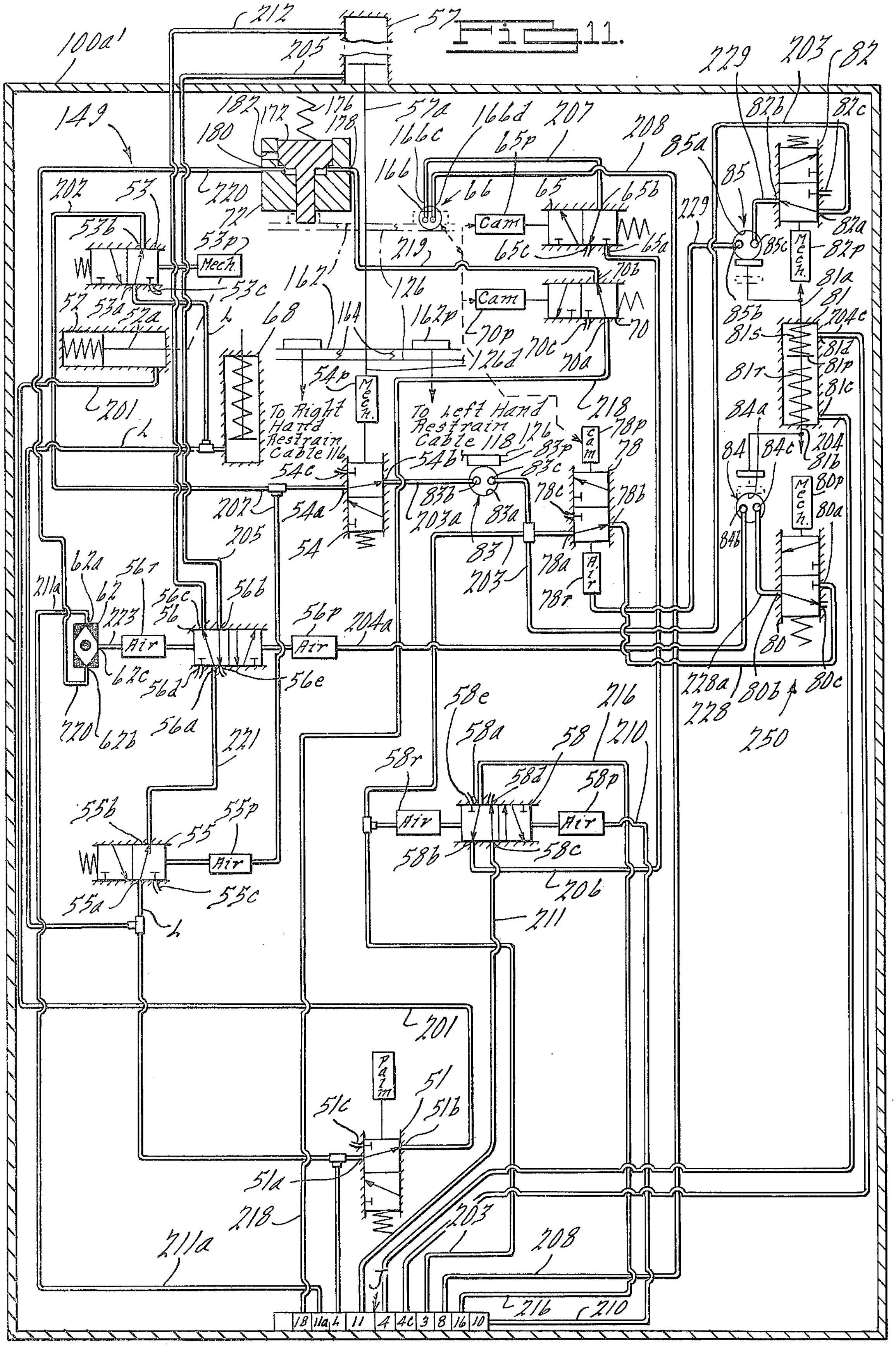
FIG. 11 is a schematic diagram of a portion of the pneumatic control circuit of the safety mechanism of FIG. 1.

Body 160 is also constructed to provide a three-way, exhaust valve which is identified by the numeral 72 in FIG. 11. As will be later seen in FIG. 11, valve 72 forms a portion of an emergency release circuit. A bore 170 extends vertically through body 160 at one side thereof and the upper end thereof is doubly counterbored as at 170*a* and 170*b*. A valving member 172 is slidable arranged within bore 170 and comprises a circular head 172*a* which fits snugly within counterbore 170*b*. One end of a spring 176 is contained within the bore 172*b* of member 172 and the other end of the spring bears against a cap 174 inserted into counterbore 170*b* so that spring 176 thereby biases member 172 to the illustrated position. In this position, head 172*a* abuts the shoulder between counterbores 170*a* and 170*b* and the lower end of member 172 protrudes from the bottom surface of member 160. A pair of holes, or ports, 178 and 180 for connection to pneumatic line fittings are fashioned in the side of member 160 facing wall 100e and small, thin passages 178a, 180a, respectively, extend from the interior ends thereof to intercept counterbore 170a. An exhaust passage 182 (FIGS. 7 and 8) is fashioned in member 160 to intercept counterbore 170b. In the illustrated position a pneumatic fluid path exists between holes 178 and 180. As will be seen in greater detail herein, in connection with the description of FIG. 11, when valve member 172 is displaced upwardly (i.e., to the left in FIGS. 8 and 10), the path between holes 178 and 180 is interrupted by being vented to exhaust via passage 182.

Figure 12:
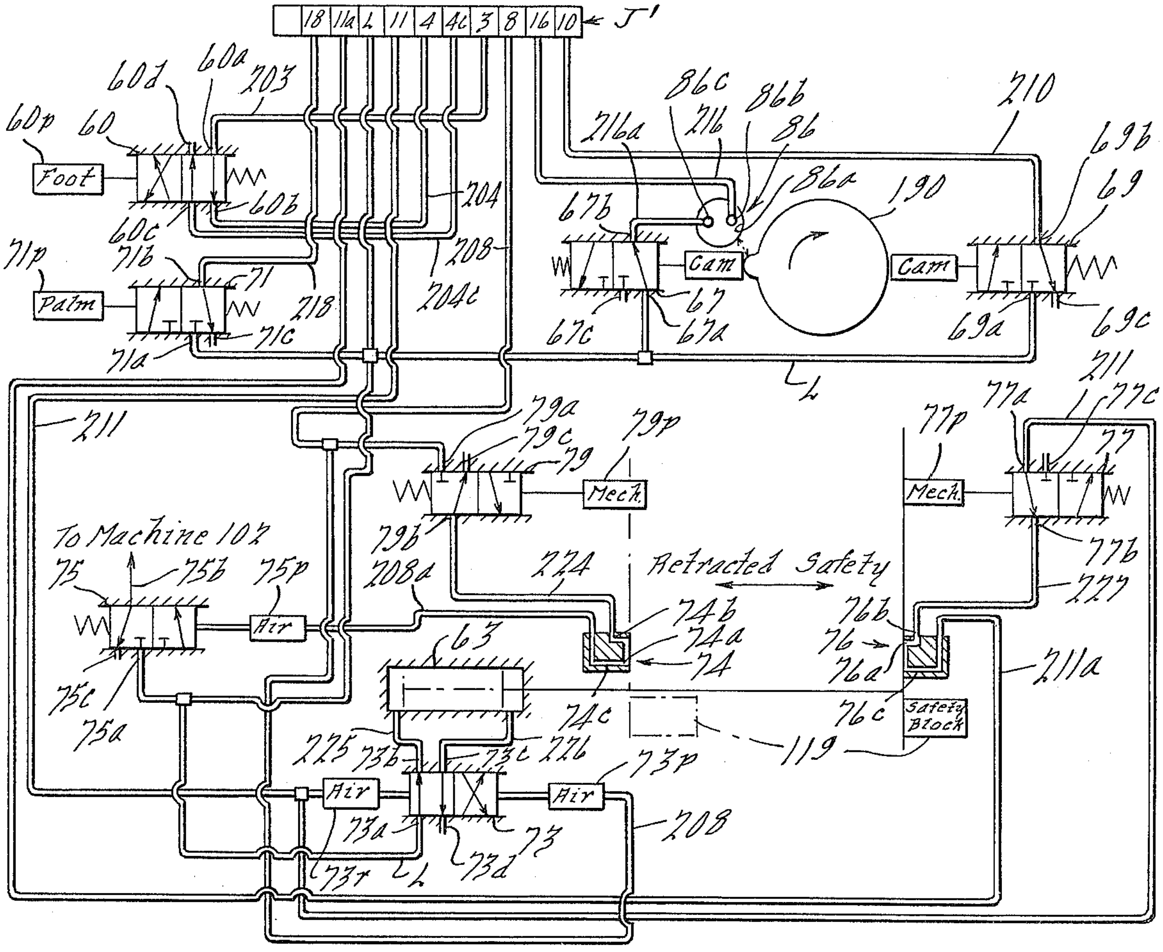
FIG. 12 is a schematic diagram of the remainder of the pneumatic control circuit of the safety mechanism of FIG. 1 and is to be taken in conjunction with FIG. 11.

The schematic diagram of the pneumatic control circuit of safety mechanism 100 is shown in FIGS. 11 and 12. FIG. 11 schematically illustrates the arrangement of the pneumatic circuit components which are contained within housing 100a' while FIG. 12 illustrates the remaining components, which are exterior of housing 100a'. Since various pneumatic circuit components within housing 100a' must be operatively coupled with various components exterior of housing 100a', certain pneumatic lines must be routed both interior of and exterior of housing 100a'. Such routing is effected via a junction J (FIG. 11) which mates with a mating junction J' (FIG. 12). The connection of similarly numbered pneumatic lines in FIGS. 11 and 12 are via similarly numbered connections at each junction. For example, connection 3 of junction J mates with connection 3 of junction J' to couple the portion of line 203 in FIG. 11 with the portion of line 203 in FIG. 12.

The portion of the circuit in FIG. 11 comprises the following circuit components: reset valve 51 (mentioned earlier in FIGS. 3 and 5), which is a two-position, three-way, spring-returned, palm-operated, normally closed type; the low air pressure safety interlock 149 (described earlier) which is composed of cylinder 52, pilot supply valve 53, which is a two-position, three-way, spring-returned, mechanically-actuated type, and cylinder 68; control valve 54 (mentioned earlier in FIG. 3), which is a two-position, three-way, spring-returned, mechanically-actuated type; a supply valve 55, which is a two-position, three-way, spring-returned, air-actuated type; a master valve 56, which is a two-position, four-way, five-ported, air-returned, air-actuated type; a pilot valve 58 which is a two-position, four-way, five-ported, air-returned, air-actuated type; a shuttle valve 62, which is a shuttle type; cam valve 65 (mentioned earlier in FIGS. 3 and 4), which is a two-position, three-way, spring-returned, cam-actuated type; failsafe valve 66 (mentioned earlier in FIGS. 7—10); cam valve 70 (mentioned earlier in FIGS. 3 and 4) which is a two-position, three-way, spring-returned, cam-actuated, normally open type; exhaust valve 72 (described earlier in FIGS. 7–10); a pilot valve 78 (mentioned earlier in FIGS. 3 and 4) which is a two-position, three-way, cam-actuated, air-returned type; a pilot valve 80, which is a two-position, three-way, mechanically-actuated, spring-returned type; a pilot valve 82, which is a two-position, three-way, mechanically-actuated, spring-returned type; a failsafe valve 83, which is functionally equivalent to failsafe valve 66; a failsafe valve 84, which is functionally equivalent to failsafe valve 66; a failsafe valve 85, which is functionally equivalent to failsafe valve 66; and a pilot cylinder 81 which, as will be explained in greater detail hereinafter, is operatively associated with valves 78, 80, 82, 84, and 85 in the pneumatic circuit to constitute a non-repeat circuit 250. While valves 55, 56, 58, 80, 82, 83, 84, 85 and cylinder 81 are contained in housing 100a', they, along with the various pneumatic lines interconnecting the valves have been omitted for sake of clarity in FIG. 3 and related mechanical drawing figures.

In FIG. 12 the remainder of the circuit is seen to comprise the follwing components: foot pedal valve 60 (mentioned earlier in FIG. 1), which is a two-position, four-way, spring-returned, foot-actuated type; a cam valve 67, which is a two-position, three-way, spring-returned, cam-actuated, normally closed type; a cam valve 69, which is a two-position, three-way, spring-returned, cam-actuated, normally closed type; an emergency valve 71 which is a two-position, three-way, spring-returned, palm-actuated, normally closed type; a master valve 73, which is a two-position, four-way, air-actuated, air-returned, type; a failsafe valve 74, which is functionally equivalent to failsafe valve 66; a pilot valve 75, which is a two-position, three-way, air-actuated, spring-returned type; a failsafe valve 76, which is functionally equivalent to failsafe valve 66; a pilot valve 77, which is a two-position, three-way, mechanically-actuated, spring-returned type; a pilot valve 79, which is a two-position, three-way, mechanically-actuated, spring-returned type; a failsafe valve 86, which is functionally equivalent to failsafe valve 66; and cylinder 63 (mentioned earlier in FIG. 1) for operating safety block 119.

In the ensuing description, all valves are selectively operable between an actuated position and a released (or returned) position. For mechanically-actuated, cam-actuated or air-actuated, spring-returned valves, the actuated position thereof refers to that position where the valve actuator is displaced against the bias of its spring, and the released position refers to the valve position to which the valve actuator is normally biased by the spring. All air-actuated or cam-actuated, air-return valves are illustrated in the returned position. For failsafe valves 66, 74, 76, 83, 84, 85 and 86, the actuated position refers to that position of the valve wherein the valve can conduct a fluidic signal. For valve 72, the actuated position refers to the position where it vents to exhaust. FIGS. 11 and 12 illustrate the safety mechanism in the following condition: cylinder 57a fully extended (i.e., hand restraints released); foot pedal valve 60 released; cylinder 63 fully extended (i.e., safety block 119 in the safety position); and the low air pressure safety interlock 149 reset. Machine element 102a is stopped at its upper limit of travel.

Looking now at the detailed circuit arrangement of the above components, valves 67, 69 and 86 (FIG. 12) are arranged for actuation in predetermined relation to the stroke of machine element 102a. Valves 67 and 86 are pneumatically coupled in series by a pneumatic line 216a to transmit a fluidic signal only when machine element 102a is at its upper limit of travel (i.e., at top dead center or ram-up position); valve 69 is arranged to transmit a fluidic signal only when element 102a is at its lower limit of travel (i.e., bottom dead center). More specifically, the system air supply line L connects to inlet 67a of valve 67 and to inlet 69a of valve 69. Outlet 67b of valve 67 connects via line 216a to port 86c of valve 86, and port 86b of valve 86 connects via line 216 to the inlet 58a of valve 58 in FIG. 11. Port 67c of valve 67 vents to exhaust. Outlet 69*b* of valve 69 connects via line 210 to the air actuating pilot 58*p* of valve 58. Proper valve actuation is attained by an operative coupling with machine 102. This operative coupling may be with any element (or elements) of machine 102 so long as valves 67 and 86 are operated to their actuated positions when machine element 102*a* is at top dead center and valve 69 is operated to its actuated position some time during the stroke of element 102*a* (for example, when element 102*a* is at bottom dead center). One possible way of actuating valves 67 and 69 is via a rotary cam 190 which rotates in synchronism with the stroke of machine element 102*a*, making one revolution for each stroke (one revolution constituting a downstroke and an upstroke). When machine element 102*a* comes to bottom dead center, valve 69 is actuated by cam 190 to transmit air to pilot 58*p*. Only when machine element 102*a* is at top dead center or rest is valve 67 actuated (as illustrated in the drawing) by cam 190 to transmit air to port 86*c* of failsafe valve 86. The open bore 86*a* of valve 86 is closed by another cam actuator (not shown in FIG. 12) as element 102*a* completes a final increment of its upstroke. (The particular construction details of valve 86 will be explained later in FIGS. 13 and 14.) Hence, as element 102*a* completes its upstroke, valve 86 is actuated just prior to valve 67 so that air is transmitted through the two valves to inlet 58*a* of valve 58 only after element 102*a* has arrived at top dead center. It is desirable and beneficial to actuate valve 86 slightly before valve 67 so that the cam actuator for valve 86 does not have to close against the force of a jet of air being exhausted through bore 86*a* which would be the case if valve 67 were actuated first. Thus, valves 67 and 86 constitute a failsafe circuit for sensing when element 102*a* is at top dead center.

Valves 73, 74, 76, 77 and 79 (FIG. 12) are operatively associated with the mechanical safety interlock provided by block 119 and cylinder 63. Valve 73 is arranged to control the extension and retraction of cylinder rod 63*a* to which block 119 is affixed. The system air supply line L connects to the inlet 73*a* of valve 73 while the outlet 73*b* of the valve connects via line 225 to the head end of cylinder 63. The rod end of cylinder 63 connects via line 226 to port 73*c* of the valve and port 73*d* vents to exhaust. The return pilot 73*r* of valve 73 connects via line 211 with port 58*c* of valve 58 in FIG. 11. The actuating pilot 73*p* of valve 73 connects via line 208 with port 166*d* of failsafe valve 66 in FIG. 11. With valve 73 in the return position as illustrated in the drawing, valve 73 supplies air to the head end of cylinder 63 and vents the rod end thereof, whereby cylinder rod 63*a* is extended to move safety block 119 to the safety position. When valve 73 is in the actuated position, it supplies air to the rod end of cylinder 63 and vents the head end thereof, whereby cylinder rod 63*a* is retracted to return safety block 119 to the retracted position. Valves 76 and 77 are connected in series and constitute a failsafe circuit for sensing when safety block 119 is in the safety position. In similar fashion, valves 74 and 79 are connected in series and constitute a failsafe circuit for sensing when safety block 119 is in the retracted position. More specifically, line 211 connects to inlet 77*a* of valve 77; outlet 77*b* of valve 77 connects via line 227 to port 76*b* of valve 76; port 76*c* of valve 76 connects via line 211*a* 79 by operating the actuator to inlet 62*a* of shuttle valve 62 in FIG. 11. When safety block 119 is in the safety position as illustrated in the drawing, an actuating arrangment which is movable with cylinder rod 63, and is only schematically illustrated in FIG. 12, actuates valve 76 by closing the open bore 76*a* thereof and actuates valve 77 via the actuator 77*p* thereof. Desirably, valve 76 is arranged for actuation just prior to actuation of valve 77 as safety block 119 approaches the safety position. Thus, when safety block 119 is at the safety position, air can be conducted through valves 77 and 76 to inlet 62*a* of shuttle valve 62. In similar fashion, when safety block 119 is retracted, the actuating arrangment on cylinder rod 63*a* now actuates valve 74 by closing the bore 74*a* thereof and valve 74 79*p* thereof. Preferably valve 74 is actuated just prior to valve 79. Thus, with safety block 119 in the retracted position, air can be conducted from port 166*d* of valve 66 in FIG. 11 through valves 74 and 79 to pilot 75*p* of valve 75. Supply line L connects to inlet 75*a* of valve 75 and outlet 75*b* to machine 102. Thus, when valve 75 is actuated, a signal is transmitted therethrough to machine 102, and this signal is used to initiate a stroke of element 102*a*.

Still considering FIG. 12, line 203 connects inlet 60*a* of valve 60 with port 83*c* of valve 83 in FIG. 11; ports 60*b* and 60*c* of valve 60 connect via lines 204 and 204*c*, respectively, with non-repeat circuit 250 in FIG. 11; port 60*d* vents to exhaust. In the illustrated released position of valve 60, it can transmit air from port 83*c* of valve 83 to port 81*c* of cylinder 81 while venting the other port 81*d* of cylinder 81 to exhaust. When valve 60 is actuated, it can transmit air from port 83*c* to port 81*d* while venting port 81*a c* to exhaust. Valve 71 is utilized in the emergency release circuit mentioned before and its circuit connection and operation will be explained later when the emergency release circuit is described.

Turning now to details of FIG. 11 and first to non-repeat circuit 250, cylinder 81 comprises a piston 81*p* which, when equal pressures exist at ports 81*c* and 81*d*, is biased to the center of the cylinder by a pair of springs 81*r* and 81*s* which bear against opposite sides of piston 81*p* within the cylinder. When pressure is supplied to port 81*c* and not to port 81*d* as illustrated in the drawing, piston 81*p* is displaced upwardly against the bias of spring 81*s*. An actuator 81*a* at the upper end of the cylinder is movable with piston 81*p* and is arranged to actuate valves 82 and 85 when piston 81*p* is displaced upwardly within the cylinder. When pressure is supplied to port 81 *d* and not to port 81*c*, piston 81*p* is displaced downwardly against the bias of spring 81*r*. In this position an actuator 81*b* at the lower end of the cylinder actuates valves 80 and 84.

Valves 82 and 85 are connected in series and constitute a failsafe circuit for sensing when piston 81*p* is displaced upwardly within cylinder 81. More specifically, the inlet 82*a* of valve 82 connects via line 203 to port 83*c* of valve 83; outlet 82*b* of valve 82 connects to port 85*c* of valve 85; port 85*b* of valve 85 connects via line 229 to the return pilot 78*r* of valve 78; and port 82*c* of valve 82 vents to exhaust. With piston 81*p* displaced upwardly within cylinder 81 (as illustrated) actuating arrangement 81*a* closes the bore 85*a* of valve 85 and actuates valve 82 via the actuator 82*p* thereof. Desirably, valve 85 is actuated just before valve 82 as piston 81*p* is displaced upwardly. Thus, with piston 81*p* displaced fully upwardly within cylinder 81, valves 82 and 85 can transmit air from valve 83 to pilot 78r of valve 78. Insimilar fashion, valves 80 and 84 are connected in series and constitute a failsafe ciricuit for sensing when piston 8p is displaced downwardly within cylinder 81. In particular, outlet 78b of valve 78 connects via line 228 to inlet 80a of valve 80; outlet 80b of valve 80 connects via line 228a to port 84c of valve 84; port 84b of valve 84 connects via line 204a to the air-actuating pilot 56p of valve 56; and port 80c of valve 80 vents to exhaust. Inlet 78a of valve 78 connects via line 203 with port 83c of valve 83 and the port 78c of valve 78 vents to exhaust. When piston 81p is displaced downwardly within cylinder 81, actuating arrangment 81b closes the bore 84a of valve 84 and actuates valve 80 via the actuator 80p thereof. Desirably, valve 84 is actuated just before valve 80 as piston 81p is displaced downwardly. Thus, with valve 78 in its return position, as illustrated, valves 80 and 84 can transmit air from valve 83 to pilot 56p when piston 81p is displaced fully downwardly within cylinder 81. As will be explained more detailedly hereinafter, non-repeat circuit 250 prevents the safety mechanism and the machine from executing more than a single cycle at a time by requiring foot pedal valve 60 to be released and then actuated before a subsequent cycle can occur.

Considering still further details of FIG. 11, reset valve 51 is provided to reset the safety mechanism at the beginning of the operating sequence if resetting is required. The system air supply line L is connected to the inlet 51a of valve 51 and outlet 51b of valve 51 is coupled via a pneumatic line 201 with the rod end of cylinder 52. With this arrangement, when valve 51 is operated to the actuated positon (as illustrated), it opens to supply air to cylinder 52 thereby displacing cylinder rod 52a (FIG. 3) to the retracted position and hence moving slide 152 out of the path of travel of member 126. Supply line L is also directly connected to the head end of cylinder 68. So long as sufficient line air pressure is available, cylinder 68 is extended to latch slide 169 in groove 152a to lock cylinder rod 52a in the retracted position, and hold slide 152 out of the path of travel of member 126. This condition is maintained after valve 51 is released to its return position only so long as sufficient line pressure exists. When the line pressure drops below a predetermined minimum, slide 169 unlatches slide 152 thereby permitting the latter to be disposed in the path of travel of member 126. Hence, a safety is provided in the event of loss of system pressure.

Supply line L also connects to inlet 53a of valve 53 and the outlet 53b of valve 53 connects via line 202 to pilot 55p of valve 55. Outlet 53c of valve 53 vents to exhaust. As will be remembered from earlier description, since valve 53 is actuated when low air pressure safety circuit 149 is reset, valve 53 supplies air to inlet 54a and pilot 55p so long as the line air pressure remains above the predetermined minimum. Line L also connects to inlet 55a of valve 55, and with pilot 55p being actuated, valve 55 transmits air to valve 56 via line 221 which connects between outlet 55b of valve 55 and inlet 56a of valve 56. Thus, so long as the system air pressure is above the predetermined minimum, air is always supplied to inlet 56a. Outlet 56b of valve 56 connects via line 205 to the rod end of cylinder 57 and the head end of cylinder 57 connects via line 212 with port 56c of valve 56. Ports 56d and 56e of valve 56 vent to exhaust. With this arrangement, when valve 56 is in the return position as illustrated in the drawing, it transmits air to the head end of cylinder 57 and vents the rod end thereof to exhaust whereby cylinder rod 57a is extended. When valve 56 is in the actuated position, it transmits air to the rod end of cylinder 57 and vents the head end thereof to exhaust, whereby cylinder 57a is retracted. As will be seen later, valve 56 is operated to the actuated position in response to air supplied via line 204a from non-repeat circuit 250 and to the return position via air supplied to pilot 56r through shuttle valve 62 from the safety block circuit.

Line 202 also connects to inlet 54a of valve 54. The outlet 54b of valve 54 connects to port 83b of valve 83, while port 54c of valve 54 vents to exhaust. Valves 54 and 83 are connected in series and constitute a failsafe circuit for sensing when cylinder rod 57a is fully extended and hence, sensing when the hand restraints are in the released position. Thus, when valve 54 is actuated by actuator 126 and the bore 83a of valve 83 is closed by pad 83p, air is transmitted through the two valves to those circuit components which are commonly connected via line 203 to port 83c . Preferably, valve 83 is actuated just before valve 54 as cylinder rod 57a approaches the extended position.

In addition to the connections to valve 58 which have already been enumerated, outlet 58b of valve 58 connects via line 206 to inlet 65a of valve 65. Ports 58d and 58e vent to exhaust. Outlet 65b of valve 65 connects via line 207 to port 166c of valve 66. Thus, valves 65 and 66 are connected in series and constitute a failsafe circuit for sensing when cylinder rod 57a is fully retracted and hence, sensing when the hand restraints are in the restraining position. Because of the yieldable connection of member 162 on member 126, bore 166 is closed by pad 162p just prior to the actuation of valve 65 by member 126. Thus, when the hand restraints are fully retracted, a signal from valve 58 can be transmitted through valves 65 and 66 to valve 73. Valve 78 is also actuated by member 126 when cylinder rod 57a is fully retracted.

In light of the foregoing detailed description of the various portions of FIGS. 11 and 12, the overall operation of the safety mechanism can now be fully appreciated. First, if necessary, valve 51 is actuated to reset circuit 149. Safety block 119 is in the safety position and the hand restraint safety mechanism 100a is in the released position. After operator 106 has loaded a workpiece into machine 102, he actuates valve 60. This causes piston 81p to be displaced downwardly within cylinder 81, thereby actuating valves 80 and 84. Since valves 54 and 83 are presently all actuated, the actuation of valves 80 and 84 causes air to be supplied to pilot 56p of valve 56, thereby operating this latter valve to the actuated position. Cylinder 57 now begins to retract, thereby operating hand restraint safety mechanism 100a to the restraining position.

As cable attaching member 126 retracts, it releases valves 54 and 83. Accordingly, port 81d of cylinder 81 vents to exhaust and springs 81s and 81 r center piston 81p within cylinder 81 whereby all four valves 80, 82, 84 and 85 are now released. Note also that pilot 56p now vents to exhaust.

When member 126 is fully retracted, valves 65 and 66 are actuated to cause the air which is presently being transmitted through valve 67, valve 86 and valve 58 to the inlet 65a of valve 65 to be further transmitted through valves 65 and 66 to pilot 73p of valve 73. Since pilot 73*r* is presently being vented through valve 58, valve 73 operates to the actuated position to thereby retract safety block 119 from the safety position to the retracted position. From this operating arrangement, it will be observed that the hand restraint must be in the retracted position before safety block 119 can be retracted from its safety position and failsafe operation is attained via the failsafe circuit of valves 65 and 68. As block 119 begins to retract from the safety position, valves 76 and 77 are released. Release of these valves vents inlet 62*a* of valve 62 to exhaust so that it now becomes impossible for valve 56 to extend cylinder rod 57*a*. Hence, so long as safety block 119 is away from its safety position, the operator is prevented by the hand restraint mechanism from having manual access to the work area of the machine. When safety block 119 is fully retracted, valves 74 and 79 are actuated. The air signal from valve 66 is now transmitted through valve 79 and valve 74 to actuate valve 75 and supply a signal to machine 102 for initiating the stroke of element 102*a*. Note that because of the failsafe circuit constituted by valves 74 and 79 which is in series with the failsafe circuit constituted by valves 65 and 66, both the hand restraints and the safety block must be in the retracted positions before machine element 102*a* can stroke. Thus, optimum safety is ensured.

As machine element 102*a* begins its downstroke, valve 67 is released and this removes air from all circuits which are supplied from it, venting these to exhaust. However, nothing else happens immediately. When valve 69 is actuated, pilot 58*p* is energized, thereby actuating valve 58, pilot 58*r* having been previously vented to exhaust. Valve 67 is again actuated at the conclusion of the stroke of element 102*a* so that air is then supplied through valve 58 to pilot 73*r* of valve 73. Valve 73 now operates to the return position to extend cylinder 63 and thereby shift safety block 119 to the safety position. As safety block 119 advances toward the safety position, valves 74 and 79 are released, whereby it becomes impossible to actuate valve 75. When safety block 119 arrives at the safety position, valves 77 and 76 are actuated to conduct the signal being supplied through valves 67 and 58 to inlet 62*a* of shuttle valve 62 and hence to operate valve 56 to the return position since, as mentioned before, pilot 56*p* is presently vented to exhaust. Now, cylinder rod 57*a* extends to release the hand restraints. It will be noted that such extension can occur only when the failsafe circuit constituted by valves 76 and 77 senses that safety block 119 is in the safety position. Thus, only after all moving elements on the machine have stopped, including safety block 119, is it possible for the hand restraints to release.

When the member 126 is fully extended, valves 54 and 83 are actuated to supply air to all components which connect commonly with line 203. Hence, valve 58 operates to the return position and air is supplied to inlet 60*a*, inlet 78*a* and inlet 82*a*. Shifting of valve 58 to the return position permits air from valve 67 to be supplied to inlet 65*a* of valve 65 but since 65 is closed, the air is transmitted no further.

Since valve 78 was closed by member 126 when the hand restraints were retracted, it will be observed that air to valves 80 and 84 is blocked. Accordingly, if the operator is still actuating foot pedal valve 60 at the conclusion of the cycle of the safety mechanism, piston 81*p* cannot be displaced downwardly within cylinder 81 to actuate valves 80 and 84. Hence, cylinder rod 57*a* is prevented from retracting. The non-repeat circuit thereby prevents a subsequent cycling from occurring. The only way for a subsequent cycle to occur is if the operator releases valve 60 after valves 54 and 56 have been actuated. When this is done, piston 81*p* is displaced upwardly within cylinder 81 to actuate both valves 82 and 85. The air being supplied from valve 83 to valve 82 is now transmitted through valves 82 and 85 to pilot 78*r* of valve 78, thereby shifting this latter valve to the return position. In the return position, valve 78 opens to supply air to inlet 80*a* of valve 80. However, since piston 81*p* is now at its upper position, valves 80 and 84 are released and the signal to valve 56 for extending cylinder rod 57*a* can be transmitted through valves 80 and 84 only be actuating valve 60 to move piston 81*p* downwardly within cylinder 81. Thus, the non-repeat feature provides particularly advantageous operation in preventing a subsequent cycle should the foot pedal 60 be depressed at the conclusion of an operating cycle. However, it will be noted that even if a subsequent cycle were to accidentally occur for any reason whatsoever, the hand restraint safety would still withdraw the operator's hand from the machine befor element 102*a* and block 119 were operated.

The emergency release circuit mentioned earlier comprises valve 70, valve 71, and valve 72. Basically, the emergency release circuit permits the hand restraints to be returned to their released position if for any reason one or both of the cables 116, 118 become fouled or snagged thereby preventing safety mechanism from being operated to the restraining position. With valves 72 and 70 in their non-actuated positions, valve 71, when actuated, conducts air from line L via line 218 through valve 70 and then via line 219 through valve 72 and then via line 220 to inlete 62*b* of shuttle valve 62. In turn, valve 56 is operated by pilot 56*r* to its return position. Since actuation of valve 71 will customarily occur only when cylinder rod 57*a* is being retracted, valve 56 is always shiftable to the return position because pilot 56*p* vents to exhaust upon release of foot pedal valve 60. With valve 56 thus shifted to the return position, the travel of cylinder rod 57*a* is immediately reversed to operate the safety mechanism to the released position. The fouled cable(s) may then be cleared.

Valve 72 also provides a failsafe feature which disables the emergency release circuit when the safety mechanism is in the restraining position. Because the connection between lines 219 and 220 is broken when valve member 72 is displaced by valve member 162, valve 56 cannot be shifted to the return position with the safety mechanism in the restraining position. Since valve 70 is actuated just prior to actuation of valve 65, the emergency release circuit is disabled just prior to the transmission of the signal from valve 66 to valve 73. Thus it is impossible for the hand restraints to be released by the emergency release circuit after movement of safety block 119 has commenced.

Figures 13, 14:
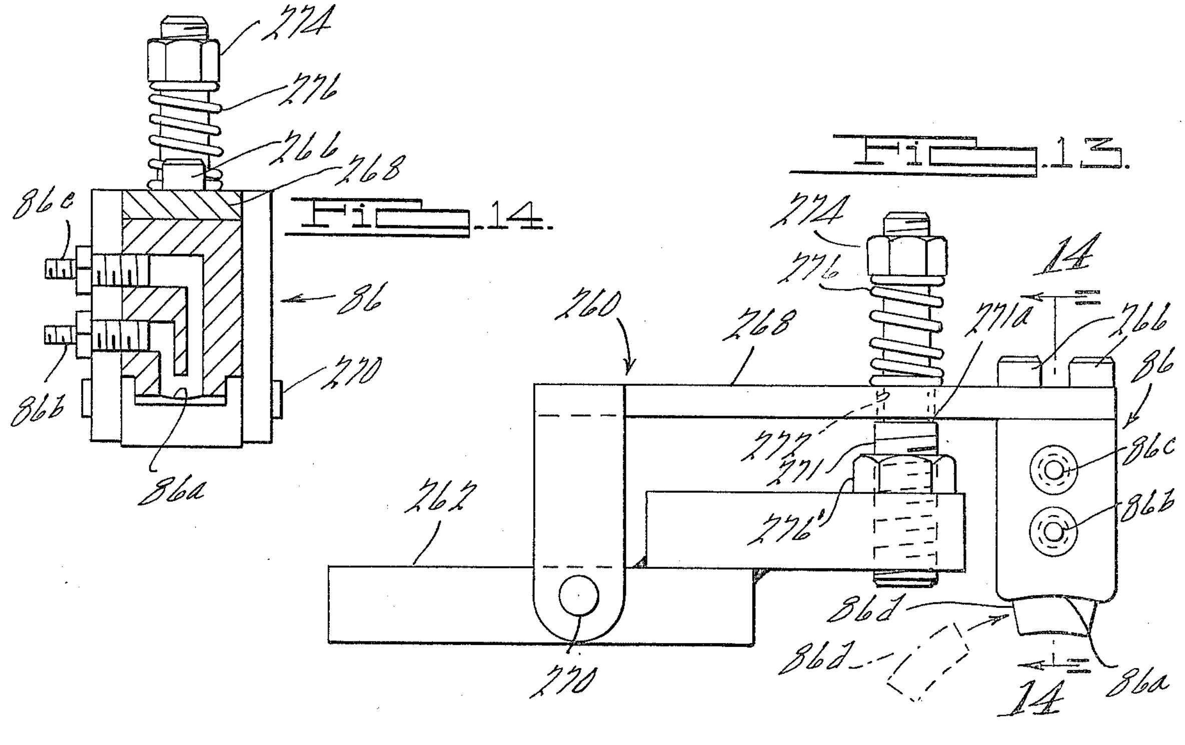
FIG. 13 is a side elevational view of one of the failsafe valves which is used in the pneumatic control circuit of FIGS. 11 and 12.
FIG. 14 is a sectional view taken along line 14—14 in FIG. 13.

Having described the overall operation of the safety mechanism, attention is now directed to the remaining drawing figures which illustrate specific details of failsafe valves which may be advantageously used in the system. FIGS. 13 and 14 illustrate specific details of valve 86 which is utilized in FIG. 12. Ports 86*b* and 86*c* are in the form of nipple fittings threaded into respective bores in the body of the valve. These valve body bores open into the common bore 86*a* which is open at the lower concavely curved surface of the valve body. When bore 86*a* is closed by a closure element such as element 86*d* (shown in FIG. 13 only), a fluid circuit path is completed between ports 86*b* and 86*c*. As mentioned earlier in FIG. 12, valve 86 is arranged for actuation in timed relation with the stroke of machine element 102*a* and as particularly illustrated by way of example in FIG. 12, via a cam operatively coupled with cam 190. Thus, in FIG. 13, element 86*d* constitutes a cam arranged for rotation with cam 190 to selectively close bore 860*a;* more specifically, element 86*d* is arranged for rotary, tangential movement, relative to the lower curved surface of the valve body as indicated by the arrow in FIG. 13. Excellent closure of member 86*d* with the valve body around bore 86*a* is attained via the mounting structure 260 for mounting valve 86. Mounting structure 260 comprises a base 262 which is disposed adjacent the rotary path of element 86*d.* Valve 86 is affixed by a pair of bolts 266 to one end of an arm structure 268 whose opposite end is hinged on base 262 as at 270. Arm 268 is biased in the clockwise direction about hinge 270 to thereby bias valve 86 generally radially inwardly of the axis about which element 86*d* rotates. This biasing arrangement is provided by a stud 271 which extends upwardly from base 262 passing through a hole 272 in arm 268. A nut 274 is threaded onto the upper end of stud 271 and a helical spring 276 is compressed between nut 274 and arm 268 to thereby urge arm against a shoulder 271*a* on stud 271. The compression force in spring 276 may be varied by adjusting nut 274 on stud 271, and the radial position to which valve 86 is biased relative to element 86*d* may be adjusted by vertically adjusting stud 271 on base 262. A nut 276' locks stud 271 on base 262. With this arrangement, valve 68 is normally biased to a position wherein the radially inner (or lower as viewed in the drawings) end thereof is positioned to be in the path of travel of element 86*d.* In this way, when element 86*d* approaches valve 86, it will first abut the valve body thereby camming the latter slightly radially outwardly against the force of spring 276. When element 86*d* stops at the solid line position of FIG. 13, it closes valve bore 86*a* and spring 276 exerts a closure force between the two whereby effective sealing and tight closure are attained. When element 86*d* begins to rotate at the beginning of the next operating stroke of machine 102, it releases the valve, thereby opening bore 86*a.*

Figures 15, 16, 17, 18, 19, 20, 21:
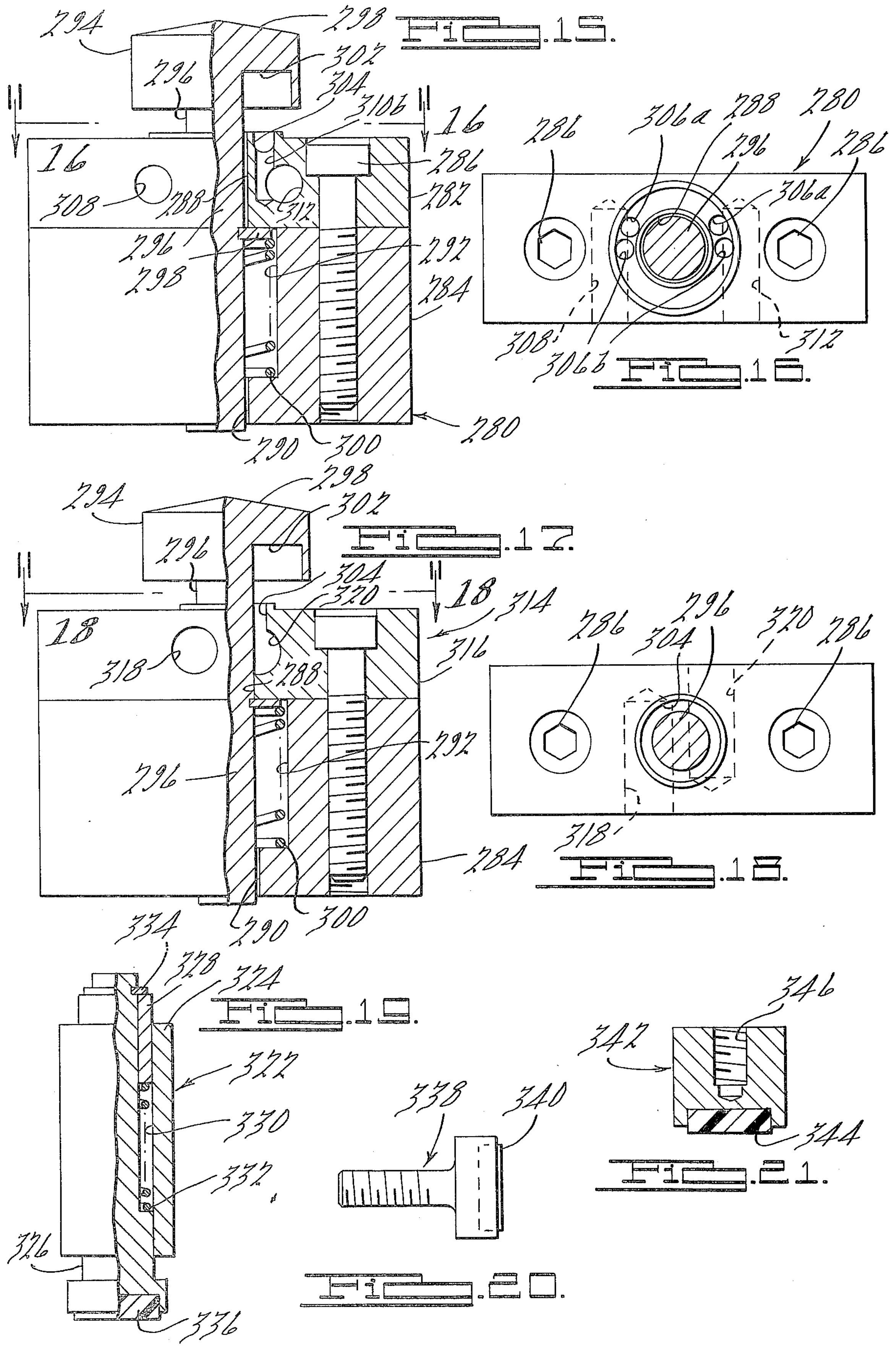
FIG. 15 is a longitudinal half sectional view of another form of valve.
FIG. 16 is a transverse sectional view taken along line 16—16 in FIG. 15.
FIG. 17 is a longitudinal half sectional view of another form of valve.
FIG. 18 is a transverse sectional view taken along line 18—18 in FIG. 17.
FIG. 19 is a longitudinal half sectional view of a valve actuator.
FIG. 20 is a longitudinal view of another actuator.
FIG. 21 is a longitudinal sectional view of yet another actuator.

FIG. 15 and 16 disclose a further embodiment of failsafe valve identified by the numeral 280. Valve 280 comprises a two-piece body formed by solid rectangular body elements 282 and 284 fastened together by a pair of bolts 286. A central circular bore 288 extends through body element 282 and aligns with a bore 290 in body element 284, the upper end of which is counterbored as at 292. A valving member 294 comprising a cylindrical stem 296 and an enlarged cylindrical head 298 has the stem 296 passing through bore 288, counterbore 292 and bore 290. An annular retaining element 298 is affixed to stem 296 within counterbore 292. A helical compression spring 300 is affixed to stem 296 within counterbore 292 around stem 296. The lower end of spring 300 bears against the shoulder between bore 290 and counterbore 292 and the upper end of spring 300 bears against retaining ring 298 to urge the ring against the lower surface of body element 282 around bore 288. Hence, spring 300 biases valving member 294 upwardly relative to the valve body so that head 298 is normally spaced from the top surface of body element 282. Head 298 is a solid but has an annular groove 302 fashioned in the underside thereof around stem 296. An annular groove 304 is fashioned in the top surface of body element 282 around and slightly outwardly from bore 288. A pair of passages 306*a*, 306*b* extend downwardly from the bottom of groove 304 at one side of bore 288 to intercept a perpendicular bore 308 extending into the body element 282 from the front surface thereof. Another pair of bores 310*a* and 310*b* extend downwardly from the bottom of groove 304 at the opposite side of bore to intercept a perpendicular bore 312 extending into body element 282 from the front surface thereof. In the illustrated position of FIG. 15, a pneumatic signal entering one of the bores 308, 312 simply vents to exhaust; however, when valving member 294 is displaced downwardly to seat head 298 against the top surface of the valve body, groove 302 in cooperation with groove 304 provides communication between the two bores, 308 and 312, whereby the pneumatic signal can be transmitted between the two bores 308, 312 via bores 306*a*, 306*d*, grooves 302, 304 and bores 310*a*, 310*b*. Thus, it can be seen that valve 280 provides the failsafe operation described earlier in connection with the system of the present invention.

FIGS. 17 and 18 disclose another valve 314 which is generally similar to valve 280. Accordingly, like elements from FIGS. 15 and 16 are retained in FIGS. 17 and 18 and only those element which are different need be described. The difference between valves 280 and 314 is that in valve 314, a body element 316 replaces body element 282. Body element 316 comprises a deeper annular groove 304 which intersects a pair of parallel bores 318, 320 extending into body element 316 from opposite sides thereof on diametrically opposite sides of bore 288. When valving member 294 is displaced downwardly to close head 298 on the top surface of body member 316, a fluidic signal may be conducted between bores 318 and 320 via grooves 304 and 302. Thus, it will be perceived valve 314 operates in the same fashion as valve 280 to attain the desired failsafe operation.

FIGS. 19, 20 and 21 disclose different forms of actuators for failsafe valves. Turning first to FIG. 19, the actuator 322 shown therein comprises a tubular body 324 within which a cylindrical actuating element 326 is arranged for axial displacement. A tubular bushing 328 is pressed into the upper end of the bore of body 324 and a helical spring 330 is disposed around element 326 between the lower end of bushing 328 and a shoulder 332 of element 326. With this arrangement, element 326 is biased downwardly relative to body 324 with downward movement of element 326 limited by a retaining ring 334 on the upper end thereof which bears against the upper end of bushing 328. The lower, or head, end of element 326 comprises a circular plastic sealing disk 336 inserted into a circular recess in the lower surface of member 326 and is adapted to seal against the open bore of a failsafe body such as the bore 166 in FIGS. 7–10. Actuator 322 is particularly useful in that it does not require the more complicated biasing arrangement such as that of valve 66 since the yieldable mounting is internally contained. Thus, in usage, body 324 may be affixed to the movable mechanism element whose position the failsafe valve is to sense; the actuator element 326 can be displaced to accommodate the final increment of travel of the moving mechanism element.

FIG. 20 illustrates an actuator 338 in the form of a stud which may be threaded into a hole in the movable mechanism element whose position the failsafe valve is to sense. Actuator 338 has a plastic sealing disk 340 in the head end thereof. The threaded mounting of actuator 338 permits adjustment thereof relative to the failsafe valve body.

FIG. 21 illustrates a further form of actuator 342 having a circular sealing disk 344 at the lower end thereof. The upper end thereof has a threaded bore 346 via which the actuator may be mounted to the movable mechanism element whose position the failsafe valve is to sense. The threaded bore 346 permits convenient adjustment of the actuator relative to the failsafe valve body.

It is to be understood that the foregoing description is that of a preferred embodiment of the invention. Various changes and modifications may be made without departing from the spirit and scope of the invention as defined by the appended claims.

I claim:

1. Safety mechanism for use by an operator of a machine having at least one machine elment which moves during each machine operating cycle: said safety mechanism including hand restraint apparatus comprising hand restraint means for the hands of the operator and hand restraint moving means operatively coupled with said hand restraint means for controlling the movement of said hand restraint means between a released position which permits at least one of the operator's hands to be disposed in the path of travel of said at least one machine element and a restraining position which prevents both of the operator's hands from being disposed in the path of travel of said at least one machine element; a mechanical safety interlock means controllably operable to a safety position wherein the same is disposed in the path of travel of said at least one machine element for bodily stopping travel thereof and to a retracted position wherein said mechanical safety interlock means clears the path of travel of said at least one machine element; a mechanical safety interlock moving means for moving said mechanical safety interlock means between said two operative positions thereof; and control means for interlocking said hand restraint moving means, said mechanical safety interlock moving means and the machine such that a machine operating cycle can begin only when both said hand restraint means is in its restraining position and said mechanical safety interlock means is in its retracted position.

2. The safety mechanism of claim 1 wherein said control means comprises means for causing said mechanical safety interlock means to remain in its safety position so long as said hand restraint means is in its released position.

3. The safety mechanism of claim 1 wherein said control means comprises means for causing said mechanical safety interlock means to remain in its safety position so long as said hand restraint means is in other than its restraining position.

4. The safety mechanism of claim 1 wherein said control means comprises means for preventing said mechanical safety interlock means from operating from its safety position to its retracted position unless said hand restraint means is in its retraining position.

5. The safety mechanism of claim 1 wherein said control means comprises means responsive to the conclusion of each machine operating cycle for causing said mechanical safety interlock means to operate from its retracted position to its safety position and means for causing said hand restraint means to operate from its restraining position to its released position only after said mechanical safety interlock means is in its safety position.

6. The safety mechanism of claim 5 wherein said control means comprises means for preventing said mechanical safety interlock means from operating from its safety position to its retracted position unless said hand restraint means is in its restraining position.

7. The safety mechanism of claim 1 wherein said control means includes actuator means actuable by the machine operator for initiating an operating cycle of the safety mechanism and the machine.

8. The safety mechanism of claim 7 wherein said control means includes means responsive to actuation of said actuator means for executing an operating cycle of the safety mechanism and the machine wherein: said hand restraint means operates from its released position to its restraining position whereby the operator's hands are removed from the path of travel of said at least one machine element; then, said mechanical safety interlock means operates from its safety position to its retracted position; then, the machine executes its operating cycle; then, said mechanical safety interlock means operates from its retracted position to its safely position; and then, said hand restraint means operates from its restraining position to its released position whereby the operator can once again have manual access to the machine.

9. The safety mechanism of claim 8 wherein said control means includes failsafe sensing circuit means for sensing when said hand restraint means is in its restraining position, said failsafe sensing circuit means comprising means forming a fluid circuit path through which a fluidic signal may be conducted to indicate that said hand restraint means is in its restraining position.

10. The safety mechanism of claim 8 wherein said control means includes failsafe sensing circuit means for sensing when said hand restraint means is in its released position, said failsafe sensing circuit means comprising means forming a fluid circuit path through which a fluidic signal may be conducted to indicate that said hand restraint means is in its released position.

11. The safety mechanism of claim 8 wherein said control means includes failsafe sensing circuit means for sensing when said mechanical safety interlock means is in its safety position, said failsafe sensing circuit means comprising means forming a fluid circuit path through which a fluidic signal may be conducted to indicate that said mechanical safety interlock means is in its safety position.

12. The safety mechanism of claim 8 wherein said control means includes failsafe sensing circuit means for sensing when said mechanical safety interlock means is in its retracted position, said failsafe sensing circuit means comprising means forming a fluid circuit path through which a fluidic signal may be conducted to indicate that said mechanical safety interlock means is in its retracted position.

13. The safety mechanism of claim 8 wherein said control means further comprises non-repeat circuit means responsive to actuation of said actuator means for preventing a subsequent operating cycle of the safety mechanism and the machine unless said actuator means is released after actuation thereof.

14. The safety mechanism of claim 13 wherein said non-repeat circuit means comprises: selectively operable means selectively operable to a first state wherein an operative connection exists between said actuator means and said hand restraint moving means through which operation of said hand restraint moving means can be initiated by actuation of said actuator means and to a second state wherein said operative connection is broken; means for causing said selectively operable means to switch from its first state to its second state after operation of said hand restraint moving means has been initiated in response to actuation of said actuator means; and means for causing said selectively operable means to return to its first state in response to release of said actuator means.

15. The safety mechanism of claim 14 wherein said control means comprises means for causing said selectively operable means to switch from its first state to its second state only after said hand restraint means begins to travel from its released position to its restraining position.

16. The safety mechanism of claim 15 wherein said control means comprises means for permitting said selectively operable means to switch from its second state back to its first state only after the conclusion of an operating cycle.

17. The safety mechanism of claim 1 wherein said mechanical safety interlock moving means comprises a power cylinder having an extendable and retractable rod.

18. The safety mechanism of claim 17 wherein said mechanical safety interlock means comprises a metal block affixed to the rod of said power cylinder.

19. The safety mechanism of claim 1 wherein said control means includes failsafe sensing circuit means operatively associated with said mechanical safety interlock means for sensing when said mechanical safety interlock means is at one of its two operative positions.

20. The safety mechanism of claim 19 wherein said failsafe sensing circuit means comprises a pair of sensing elements connected in series circuit and forming a fluid path through which a fluidic signal may be conducted when said mechanical safety interlock means is in said one operative position thereof.

21. The safety mechanism of claim 20 wherein one of said sensing elements comprises a failsafe valve means, said failsafe valve means comprising closure means movable with said mechanical safety interlock means, a valve body disposed in the path of travel of said closure means, a pair of bores in said body open toward said closure means, said closure means and said valve body being arranged and constructed such that when said mechanical safety interlock means is in said one position, said closure means abuts said valve body to complete a fluid path between said two bores, said two bores being operatively coupled in fluid circuit with said control means to conduct a fluid signal indicative of the mechanical safety interlock means being at said one operative position thereof.

22. The safety mechanism of claim 21 wherein the other sensing element comprises a normally closed three-way valve connected in series with said failsafe valve means, said three-way valve opening when said mechanical safety interlock means is at said one operative position thereof.

23. The safety mechanism of claim 22 wherein said two valves are arranged such that said closure means completes the fluid path between said two bores of said failsafe valve means before said three-way valve opens.

24. The safety mechanism of claim 20 wherein said failsafe sensing circuit means is arranged to sense the safety position of said mechanical safety interlock means.

25. The safety mechanism of claim 24 wherein said control means includes means operatively coupling said failsafe sensing circuit means with said hand restraint moving means such that when said failsafe sensing circuit means completes said fluid path, a signal is transmitted therethrough to cause said hand restraint moving means to operate from its restraining position to its released position.

26. The safety mechanism of claim 20 wherein said failsafe sensing circuit means is arranged to sense the retracted position of said mechanical safety interlock means.

27. The safety mechanism of claim 26 wherein said control means includes means operatively coupling said failsafe sensing circuit means with the machine such that when said failsafe sensing circuit means completes said fluid path, a cycle start signal is supplied to the machine for initiating the operating cycle thereof.

28. A hand restraint safety apparatus for use by an operator of a machine having at least one machine element which moves during each machine operating cycle, said apparatus comprising: hand restraint means for the hands of the operator and hand restraint moving means operatively coupled with said hand restraint means for controlling the movement of said hand restraint means between a released position which permits at least one of the operator's hands to be disposed in the path of travel of said at least one machine element and a restraining position which prevents both of the operator's hands from being disposed in the path of travel of said at least one machine element; control circuit means operatively coupling said hand restraint moving means and the machine; said control circuit means comprising an actuator means selectively operative to actuated and released positions; said control circuit means further comprising coupling circuit means operatively coupling said actuator means with said hand restraint moving means and the machine such that upon operation of said actuator means to the actuated position, said hand restraint moving means and the machine execute an operating cycle wherein said hand restraint means is first operated to the restraining position by said hand restraint moving means, the machine is then cycled and said hand restraint means is then operated to the released position by said hand restraint moving means; said coupling circuit means including non-repeat circuit means responsive to the operation of said actuator means to the actuated position for preventing a subsequent operating cycle unless said actuator means is returned to the released position.

29. The hand restraint safety apparatus of claim 28 wherein said coupling circuit means includes means for operatively disconnecting said hand restraint moving means from said actuator means after said hand restraint moving means has been actuated in response to an initial actuation of said actuator means and means responsive to return of said actuator means to the released position to again operatively couple said actuator means to said hand restraint moving means so that a subsequent cycle may be commenced by again actuating said actuator means.

30. The hand restraint safety apparatus of claim 29 wherein said coupling circuit means further includes means for preventing said hand restraint moving means from being operatively recoupled to said actuator means unless said hand restraint means is in the released position.

31. The hand restraint safety apparatus of claim 28 wherein said non-repeat circuit means comprises switchable means switchable between first and second conditions, said switchable means when in said first condition operatively coupling said actuator means with said hand restraint moving means such that said hand restraint moving means is responsive to actuation of said actuation means and said switchable means when in said second condition operatively disconnects said hand restraint moving from said actuator means such that said hand restraint moving means is non-responsive to actuation of said actuator means, said switchable means being switched from its first condition to its second condition after said actuator means has initiated operation of said hand restraint moving means.

32. The hand restraint safety apparatus of claim 31 wherein said switchable means can be switched from its second condition back to its first condition only with said actuator means in the released position.

33. The hand restraint safety apparatus of claim 28 wherein said coupling circuit means includes: means forming a fluidic circuit path through which a fluidic signal is transmitted to said hand restraint moving means to initiate operation thereof when said actuator means is actuated; means for closing path after a fluidic signal has been transmitted therethrough to initiate an operating cycle; and means for again opening said path only after said actuator means has been returned to its released position.

34. The hand restraint safety apparatus of claim 33 wherein said coupling circuit means includes valve means responsive to the operation of said hand restraint moving means such that said fluid circuit path after once being closed can again open only when said hand restraint moving means is in the released position.

35. The hand restraint safety apparatus of claim 34 wherein said coupling circuit means includes a failsafe valve means for opening and closing said fluid path.

36. The hand restraint safety apparatus of claim 28 wherein said non-repeat circuit means comprises a fluid actuated device operable to first and second positions, means operatively coupling said actuator means with said device such that the latter operates to the first position thereof in response to operation of said actuator means from its released position to its actuated position, a fluid circuit comprising a valve means responsive to the operation of said fluid actuated device to its first position for supplying a fluid signal to said hand restraint moving means to initiate an operating cycle, and means responsive to the initiation of such a cycle for operating said fluid actuated device to its second position whereby the fluid signal to said hand restraint moving means is then terminated.

37. The hand restraint safety apparatus of claim 36 wherein said valve means includes a failsafe valve means.

38. The hand restraint safety apparatus of claim 37 wherein said valve means includes an additional valve means connected in series circuit with said failsafe valve means, said additional valve means being arranged to provide an open path therethrough prior to the beginning of an operating cycle so that the fluid signal can be transmitted through said fluid circuit to said hand restraint moving means to initiate a cycle, said additional valve means being arranged to close in response to operation of said hand restraint moving means, said additional valve means being opened again only in response to return of said actuator means to the released position.

39. The hand restraint safety apparatus of claim 38 wherein said fluid circuit includes a still further valve means connected in series with said additional valve means and said failsafe valve means, said still further valve means being open only when said hand restraint means is in released position.

40. The hand restraint safety apparatus of claim 28 wherein said coupling circuit means includes: means forming a fluidic circuit path through which a fluidic signal can be transmitted to said hand restraint moving means to initiate operation thereof when said actuator means is actuated, said fluidic circuit path including a first valve means and a second valve means; a fluid actuated device operatively coupled with said actuator means and said first and second valve means for operating said first and second valve means such that prior to the beginning of an operating cycle, said first valve means is closed and said second valve means is open, said first valve means is opened by said device in response to operation of said actuator means from the released position to the actuated position whereby a fluidic signal can be transmitted through said fluid circuit path to said hand restraint moving means to initiate operation thereof, and said second valve means is closed by said device after an operating cycle has been initiated and remains closed so long as said actuator means remains in the actuated position.

41. The hand restraint safety apparatus of claim 40 wherein said fluid actuated device is operatively coupled with said actuator means and said second valve means such that said second valve means can be opened by said device at the end of an operating cycle by operating said actuator means to the released position.

42. The hand restraint safety apparatus of claim 40 wherein said coupling circuit means includes means forming a second fluidic circuit path through which a fluidic signal can be transmitted to said second valve means to operate the same to the open position thereof, said second fluidic circuit path including a third valve means therein for opening and closing said second fluidic circuit path, said third valve means being positioned to be actuated by said device such that when said actuator means operates to the released position said device operates to open said third valve means thereby supplying the fluidic signal for opening said second valve means.

43. The hand restraint safety apparatus of claim 42 wherein said third valve means includes a failsafe valve means.

44. The hand restraint safety apparatus of claim 40 wherein said first valve means includes a failsafe valve means.

45. The hanad restraint safety apparatus of claim 40 wherein said fluid actuated device comprises a fluid cylinder having movable means thereon movable to a first position to actuate said first valve means and to a second position to actuate said second valve means, said fluid cylinder being operatively coupled with said actuator means and said first and second valve means such that when said actuator means operates from the released position to the actuated position said fluid cylinder operates to the first position thereby actuating said first valve means and when said actuator means operates from the actuated position to the released position, said fluid cylinder operates to its second position thereby actuating said second valve means.

46. The hand restraint safety apparatus of claim 45 wherein said fluid cylinder, said actuator means, and said first valve means are also arranged such that said first valve means can be operated from its closed position to its open position only when said hand restraint means is in the released position.

47. The hand restraint safety apparatus of claim 45 wherein said fluid cylinder, said actuator means, and said second valve means are also arranged such that said second valve means can be operated from its closed position to its open position only when said hand restraint means is in the released position.

48. The hand restraint safety apparatus of claim 45 wherein said fluid cylinder is operative to a third position wherein neither said first valve means nor second valve means is actuated, said fluid cylinder being operated to the third position after said hand restraint moving means has begun to operate in response to receipt of the fluidic signal through said first and second valve means.

49. The hand restraint safety apparatus of claim 48 wherein said fluid cylinder can operate from the third position to the second position only when said actuator means is in the released position.

50. The hand restraint safety apparatus of claim 49 wherein said fluid cylinder can operate from the third position to the second position only when said hand restraint means is also in its released position.

51. The hand restraint safety apparatus of claim 48 wherein said fluid cylinder comprises biasing means for biasing said movable means of said cylinder in said third position, said movable means being movable from the third position to the first position in one direction and from the third position to the second position in the other direction.

52. A hand restraining safety apparatus for use by an operator of a machine having operating mechanism including at least one machine element movable between a retracted position and an operative position, said apparatus comprising hand restraining means for a hand of the machine operator positionable in a first position in which the operator's hand may be positioned contiguous to said machine element and a safety position in which the operator's hand is restrained at a spaced position from the one machine element, and operating means for moving said hand restraining means from its first position to its safety position when said machine element is in its retracted position, and safety means positionable in the path of travel of a portion of said machine operating mechanism for bodily preventing the one machine element from moving from its retracted position to its operative position so long as said hand restraining means is in other than its safety position.

53. A hand restraining safety apparatus of claim 52 wherein said safety means is positionable in the path of travel of said one machine element.

* * * * *

UNITED STATES PATENT AND TRADEMARK OFFICE
CERTIFICATE OF CORRECTION

PATENT NO. : 3,884,336

DATED : May 20, 1975

INVENTOR(S) : Robert W. Williamson

It is certified that error appears in the above-identified patent and that said Letters Patent are hereby corrected as shown below:

Column 1, line 49: "restraint" should be--restraints--
Column 6, line 13: "beings" should be--begins--
Column 6, line 25: "stocked" should be--stacked--
Column 7, line 10: "will" should be--with--
Column 7, line 30: "128" should be--126--
Column 7, line 57: "cylinder" should be--circular--
Column 8, line 41: "yieldable" should be--yieldably--
Column 11, line 67: delete "79 by operating the actuator"
Column 12, line 14: "valve 74 79p thereof." should read --valve 79 by operating the actuator 79p thereof.--.
Column 13, line 4: "8p" should be--81p--
Column 15, line 8: "68" should be--66--
Column 16, line 24: "befor" should be--before--
Column 16, line 36: "inlete" should be--inlet--
Column 17, lines 61 & 62, after "spring" should read --300 is disposed within counterbore 292 around stem 296
Column 18, line 31: "element" should be--elements--
Column 20, line 30: "safely" should be--safety--
Column 23, line 20: after moving insert "means"
Column 23, line 18: "actuation" should be--actuator--
Column 23, line 36: after "closing" insert--said--
Column 25, line 1: "hanad" should be--hand--

Signed and Sealed this

*Ninth* Day of *May 1978*

[SEAL]

*Attest:*

RUTH C. MASON
*Attesting Officer*

LUTRELLE F. PARKER
*Acting Commissioner of Patents and Trademarks*